(12) United States Patent
Curtis

(10) Patent No.: US 10,491,116 B2
(45) Date of Patent: Nov. 26, 2019

(54) FAST TRANSIENT RESPONSE CIRCUIT

(71) Applicant: Microchip Technology Incorporated, Chandler, AZ (US)

(72) Inventor: Keith E. Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/892,622

(22) Filed: Feb. 9, 2018

(65) Prior Publication Data

US 2018/0226875 A1 Aug. 9, 2018

Related U.S. Application Data

(60) Provisional application No. 62/456,748, filed on Feb. 9, 2017.

(51) Int. Cl.
*H02M 3/156* (2006.01)
*H02M 1/00* (2006.01)

(52) U.S. Cl.
CPC .... *H02M 3/156* (2013.01); *H02M 2001/0019* (2013.01); *H02M 2001/0025* (2013.01); *H02M 2003/1566* (2013.01)

(58) Field of Classification Search
CPC . H02M 2001/0019; H02M 2001/0025; H02M 3/156; H02M 2003/1566
See application file for complete search history.

(56) References Cited

U.S. PATENT DOCUMENTS

| | | | | |
|---|---|---|---|---|
| 6,127,815 | A | 10/2000 | Wilcox | 323/282 |
| 6,605,931 | B2 * | 8/2003 | Brooks | H02M 3/156 323/272 |
| 7,253,593 | B1 * | 8/2007 | Chen | H02M 3/158 323/224 |
| 9,602,001 | B1 * | 3/2017 | Hung | H02M 3/158 |
| 9,667,145 | B1 * | 5/2017 | Goenawan | H02M 3/156 |
| 2005/0212499 | A1 * | 9/2005 | Yasukouchi | H02M 3/156 323/282 |
| 2008/0252277 | A1 * | 10/2008 | Sase | H02M 3/157 323/283 |

(Continued)

FOREIGN PATENT DOCUMENTS

| | | | |
|---|---|---|---|
| EP | 2299578 A2 | 3/2011 | H02M 3/156 |
| EP | 2680419 A2 | 1/2014 | H02M 3/156 |

OTHER PUBLICATIONS

International Search Report and Written Opinion, Application No. PCT/US2018/017587, 15 pages, dated May 25, 2018.

*Primary Examiner* — Fred E Finch, III

(74) *Attorney, Agent, or Firm* — Slayden Grubert Beard PLLC

(57) ABSTRACT

A circuit includes a reference voltage, a switched mode power supply (SMPS) loop filter circuit configured to provide an inductor current limit based on the reference voltage, and a trigger circuit configured to enable or disable the SMPS loop filter circuit. When the SMPS loop filter circuit is enabled, an output of the circuit is based on output of the SMPS loop filter circuit and output voltage of the SMPS. When the SMPS loop filter circuit is disabled, the SMPS current control circuit output is based on an estimated current limit that is increased when load current demand will increase and decreased when load current demand will decrease.

18 Claims, 2 Drawing Sheets

(56) References Cited

U.S. PATENT DOCUMENTS

| | | | |
|---|---|---|---|
| 2010/0052628 A1* | 3/2010 | Khayat | H02M 3/156 323/234 |
| 2010/0253307 A1* | 10/2010 | Chen | H02M 1/4225 323/283 |
| 2010/0308654 A1* | 12/2010 | Chen | H02M 3/1584 307/31 |
| 2012/0212203 A1* | 8/2012 | Harrison | H02M 3/156 323/283 |
| 2012/0293156 A1* | 11/2012 | Galbis | H02M 3/1588 323/350 |
| 2014/0002043 A1* | 1/2014 | Li | H02M 3/156 323/282 |
| 2014/0002047 A1* | 1/2014 | Houston | H02M 3/156 323/283 |
| 2014/0239927 A1* | 8/2014 | Nascimento | G05F 1/10 323/273 |
| 2015/0200592 A1* | 7/2015 | Chang | H02M 3/156 323/271 |
| 2015/0256071 A1* | 9/2015 | Penzo | H02M 3/1582 315/297 |
| 2016/0261258 A1 | 9/2016 | Van Eeden et al. | 323/271 |
| 2018/0097449 A1* | 4/2018 | Kim | H02M 3/33592 |
| 2018/0109186 A1* | 4/2018 | Zhang | H02M 3/158 |

* cited by examiner

FAST TRANSIENT RESPONSE CIRCUIT

RELATED APPLICATION

This application claims priority to U.S. Provisional Application 62/456,748 filed Feb. 9, 2017, the contents of which are incorporated by reference in their entirety.

FIELD OF THE INVENTION

The present disclosure relates to reading and writing data to power and power supplies such as switched-mode power supplies (SMPS) of electronic devices and, more particularly, to a fast-transient response circuit.

BACKGROUND

SMPS may include circuits for powering electronic devices. Electronic devices may include a variety of elements and peripherals external and internal to such electronic devices. Upon application of power to a SMPS or to such elements and peripherals, the elements and peripherals may experience a delay in receiving full power. When a SMPS turns on, the SMPS requires time to supply the sudden increase in demand of load current from the connected elements and peripherals. The connected elements and peripherals may suffer from the lag time. The overall system performance may suffer.

SUMMARY

Embodiments of the present disclosure include a circuit. The circuit may include a reference, an SMPS loop filter circuit configured to provide an inductor current limit based on the reference voltage and output voltage of the SMPS, a trigger circuit configured to enable or disable the SMPS loop filter circuit. When the SMPS loop filter circuit is enabled, an output of the circuit may be based on an output of the SMPS loop filter circuit. When the SMPS loop filter circuit is disabled, the output of the circuit may be based on an estimated current limit. In combination with any of the above embodiments, the SMPS loop filter circuit may include an op-amp. In combination with any of the above embodiments, the estimated current limit may be provided as an analog voltage signal based upon an estimation of current needed for a load. The estimated current limit may be made by software, comparators, sensors, or other circuitry or mechanisms evaluating output of the SMPS, voltage input, and SMPS topology. The estimated current limit may be set upon an anticipated changing of a load attached to the SMPS. In combination with any of the above embodiments, the circuit may further include a feedback network circuit connected to an output of the SMPS loop filter circuit and an input of the SMPS loop filter circuit. In combination with any of the above embodiments, the feedback network circuit may be further connected to a source of the estimated current limit. In combination with any of the above embodiments, the feedback network circuit may be configured to be charged to a current level. In combination with any of the above embodiments, the feedback network circuit may be configured to be charged to the current level by the SMPS loop filter circuit when the SMPS loop filter circuit is enabled. In combination with any of the above embodiments, the feedback network circuit may be configured to be charged by the source of the estimated current limit when the SMPS loop filter circuit is disabled. In combination with any of the above embodiments, the trigger circuit may be configured to indicate whether a current demand or a current demand slope has exceeded a threshold. In combination with any of the above embodiments, in combination with any of the above embodiments, the SMPS loop filter circuit may be configured to be disabled based on an indication that the current demand or the current demand slope has exceeded the threshold. In combination with any of the above embodiments, the trigger circuit may be configured to indicate whether a load current has discontinued. In combination with any of the above embodiments, the SMPS loop filter circuit may be configured to be disabled based on an indication that the load current has been discontinued. In combination with any of the above embodiments, the trigger circuit may be configured to indicate whether a current demand or a current demand slope has exceeded a threshold. In combination with any of the above embodiments, the SMPS loop filter circuit may be configured to be disabled based on an indication that the current demand or the current demand slope has exceeded the threshold. In combination with any of the above embodiments, a source of the estimated current limit may be configured to charge a feedback capacitor at a higher current level while the SMPS loop filter circuit is disabled. In combination with any of the above embodiments, after the feedback capacitor is charged, the SMPS loop filter circuit may be configured to be enabled and drive output at the higher current level. In combination with any of the above embodiments, the trigger circuit may be configured to indicate whether a load current has been reduced. In combination with any of the above embodiments, the SMPS loop filter circuit may be configured to be disabled based on an indication that the load current has been reduced. In combination with any of the above embodiments, a source of the estimated current limit may be configured to discharge a feedback capacitor to a lower higher current level while the SMPS loop filter circuit is disabled.

Embodiments of the present disclosure may include a power supply, a switched mode power supply, a power supply controller, or microcontroller include any of the circuits described above.

Embodiments of the present disclosure may include methods performed by any circuit, power supply, a switched mode power supply, a power supply controller, or microcontroller described above.

BRIEF DESCRIPTION OF THE DRAWINGS

A more complete understanding of the present disclosure may be acquired by referring to the following description taken in conjunction with the accompanying drawings wherein.

Figure 1:
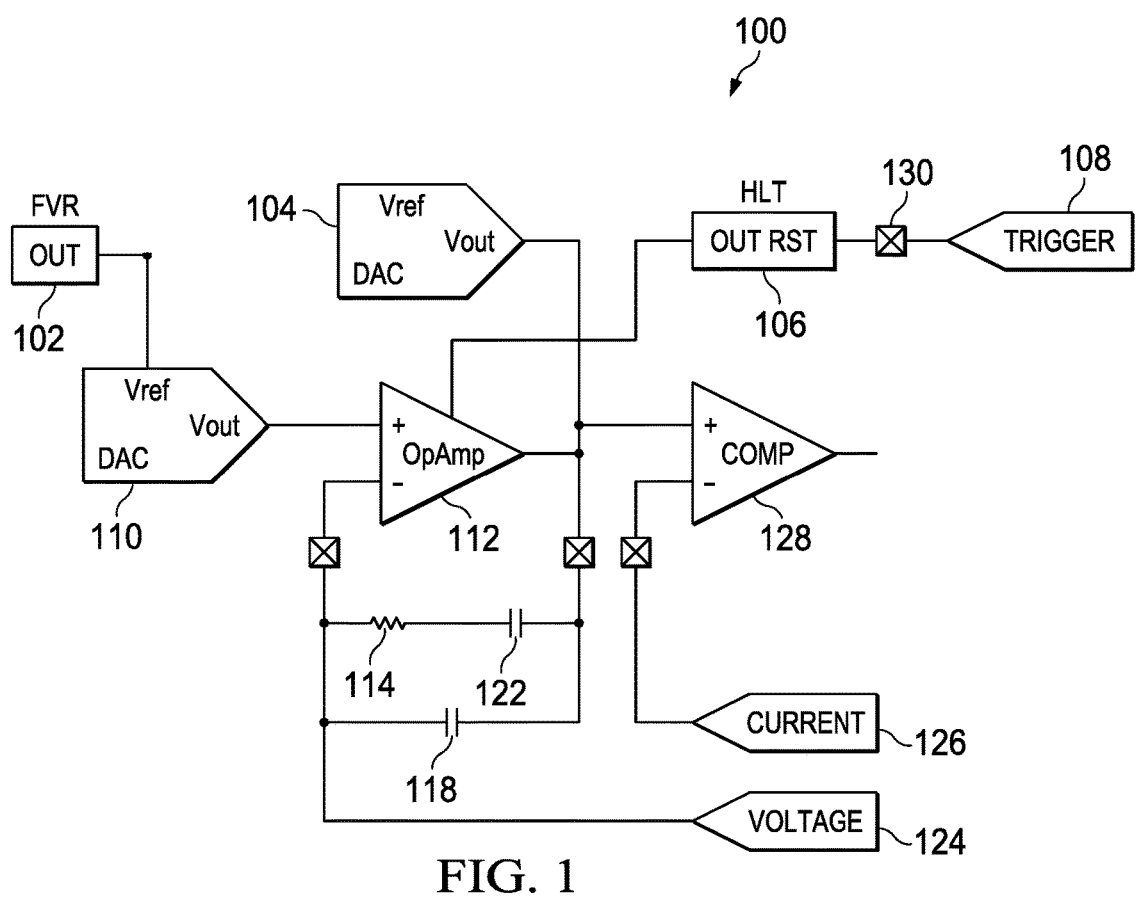
FIG. 1 illustrates a circuit for fast transient response, according to embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

FIG. 1 is an illustration of a circuit 100 configured to provide fast transient response, according to embodiments of the present disclosure. Circuit 100 may utilize various elements available within a system, system-on-a-chip, die, microcontroller, SMPS control circuit, or other electronic devices. Such elements may include core independent peripherals (CIPs).

Embodiments of the present disclosure, such as circuit 100, may solve problems associated with high load current transients in some switching power supplies. Such high load transients may cause a sag in the output voltage of the supply. For example, the power supply of a cell phone tower transmitter may cause its supply to sag when the transmitter turns on. As a result, the transmitter might be required to use an extra-long preamble for initial communication packets to ensure that sufficient voltage is available to reliably transmit the start of the packet. Embodiments of the present disclosure may allow makers of electronic devices to omit such corrective or preventative measures. Power supplies for systems with high transient current draw, such as cellular transmitters, and positioning systems suffer from the lag time of their power supply. When they turn on, the power supply requires time to supply the sudden increase in load current and the output voltage sags until the system can adapt. This results in a slowing of the system response which may result in reduced performance. When the high load current demand is removed a voltage-overshoot may occur since the loop filter has to adjust back to a lower current demand.

Digital systems, such as digital feedback power supplies, may compensate for these effects by introducing a step function into a software-based feedback filter that controls operation of the supply. The step function may be synchronized to the load change to ensure that sufficient current is available for the high load condition, and too much current is not present when the load current is reduced (e.g., load released). When the load is released, a negative step function may be introduced to prevent overshoot of the output voltage. However, this solution requires a fully digital implementation. In addition, this solution requires software to operate. Digital solutions may be more complex to design and test. Digital power supplies may require more complex design methodologies. Embodiments of the present disclosure may instead be implemented with analog elements, and without a software-based feedback filter.

Analog solutions may include, such as in cell phones, and may handle this problem by creating a boost power supply which charges a reservoir while the transmitter is off. The phone then discharges the reservoir into the supply when the transmitter turns on. This shores up the supply so that the transmitter can complete its transmission without sagging the power supply. Analog solutions, such as a reservoir, may require a separate switching power converter. A reservoir system may also require a high voltage capacitor or a high capacitance capacitor. Embodiments of the present disclosure may instead may be implemented without a reservoir, a separate switching power converter, or a separate boost power supply.

A mixed digital and analog solution may include use of a pulsed-width-modulator (PWM) controller and an associated analog filter. The PWM controller may operate at a rate of 10-20 times faster than the respective filter bandwidth so that the PWM may respond quickly to changes. However, a problem may arise in the form of response time of the analog filter in the feedback path. The capacitive elements of the filter might be required to be quickly charged to the higher current level. However, the filter topology is designed to prevent this kind of behavior. In one embodiment, the filter output may be forced to the new current level until the filter capacitor can be charged to the new, desired level. This may be performed using various other elements available for use in circuit 100, which may include CIPs.

Circuit 100 may include an intelligent, analog peripheral in the form of an op-amp 112. In one embodiment, op-amp 112 may include an override option that allows an external digital signal to tri-state the output of op-amp 112. Using this feature, it is possible to override the output of op-amp 112 with another voltage signal. For example, circuit 100 may include a digital-to-analog converter (DAC) 110 circuit connected to the positive terminal of op-amp 112. DAC 110 may be connected to a fixed voltage reference (FVR) 102, configured to output a voltage reference value. DAC 110 may be configured to convert this digital value into an analog voltage and supply it to a positive input of the op-amp 112.

Circuit 100 may include a timer circuit that may provide an enable or disable signal to control the output of the op-amp 112 (e.g., tri-state output control). In one embodiment, circuit 100 may include a hardware limit timer (HLT) circuit 106 configured to enable or disable the output of the op-amp 112. HLT 106 may be configured to provide an enable signal for the output of the op-amp 112, except during a preset time period when the HLT 106 receives a trigger or other input. Upon such trigger or other input, HLT 106 may be configured to provide a timed disable signal to disable or inactivate the output of the op-amp 112. HLT 106 may then initiate a waiting period, which may be configured through, for example, a register value or other setting thereto. After the waiting period, the enable signal may again be output from HLT 106 to re-enable the output of the op-amp 112.

A second DAC 104 may be configured (programmed) to provide a voltage value representing an estimated current level to replace the voltage output of op-amp 112 when the op-amp 112 is in a disabled or tri-state condition. DAC 104 may be configured to provide a higher current level signal or a lower current level signal to comparator 128, (depending on whether a high or lower current load is anticipated) as compared to the output of op-amp 112 during the trigger condition. The estimated current limit may be made by software, comparators, sensors, or other circuitry or mechanisms evaluating output of the SMPS, voltage input, and SMPS topology. The estimated current limit may be set upon receipt of the trigger 108 indicating a change of a load attached to the SMPS, e.g., a first trigger may cause an increase in available load current and a subsequent second trigger may cause a decrease in available load current. The estimated current limit may be input (set, programmed, etc.) into DAC 104 from, for example, a register, voltage source, or other suitable mechanism.

A feedback network may be connected to the output of op-amp 112 and to the negative input of op-amp 112. The feedback network may include, for example, a resistor 114 and a first capacitor 122 connected in series in a first branch, and a second capacitor 118 in a second branch. The first branch and the second branch of the feedback network may be in parallel with each other.

In one embodiment, circuit 100 may include a comparator 128. Comparator 128 may be configured to compare values from DAC 104 or op-amp 112 and a current 126. Comparator 128 may be the normal current mode comparator from a SMPS. It may be configured to compare inductor current against the required current output from the loop filter, embodied as op-amp 112. However, in one embodiment this feedback control may be overridden so that the current may be set to a higher or lower level by the output of DAC 104 as needed during a HLT 106 trigger event for a sudden change in output current (up or down).

Terminals 130 may indicate application of connections into or out of a semiconductor device, package, microcontroller, system-on-a-chip, die, or another electronic device. Thus, for example, FVR 102, DAC 110, DAC 104, op-amp 112, comparator 128, and HLT 106 may be included within such a semiconductor device, package, microcontroller, system-on-a-chip, die, or other electronic device. The feedback network, trigger 108, voltage feedback reference 124, and current feedback reference 126 may be located external to such a device.

Current 126 may be the inductor current feedback in the SMPS in which circuit 100 resides. Voltage 124 may be the output voltage feedback therefrom. The SMPS may supply power by comparing output voltage 124 with a reference voltage out of DAC 110. The difference may be amplified by op-amp 112 and supplied to comparator 128. At the start of a PWM pulse for the SMPS, inductor current 126 may begin to rise. When inductor current 126 feedback reaches the output of op-amp 112, the PWM may be shut off and the inductor may discharge into the output capacitor (not shown). The voltage is read back as voltage 124 and the cycle begins again. In one embodiment, circuit 100 may be configured to override the feedback loop and force the desired inductor current up or down to compensate for an increase or decrease in output current required. Trigger 128 may monitor the output current and, when there is significant change, trigger the override of the feedback loop for a fixed period until the loop filter, embodied by op-amp 112 and filter components 114, 118 and 122; may catch up and take over feedback operation.

Fixed voltage reference (FVR) 102, DAC 110, op-amp 112, comparator 128, and the feedback components 114, 118 and 122; may make up a normal operating path of a continuous conduction current mode switching power supply controller. DAC 104, HLT 106, and trigger 108 may be implemented as peripherals added to such a controller to accommodate a rapid increase and decrease in load current before normal loop control can take back over.

Trigger events may include sudden increases or decreases in output current. Trigger 108 may be supplied by, for example, a differentiator that may monitor output current, or from a source in a system controller hosting circuit 100 informing the SMPS that an element is about to be turned on or off, causing a change in current demand. A trigger event may include, for example but is not limited to, a power-up event when an element or system in which circuit 100 resides or is connected to initiates operation or otherwise powers up. When a trigger event occurs, trigger 108 may activate. HLT 106 may reset and its output may be cleared. This may turn off the output of op-amp 112. Consequently, the output of DAC 104 may then drive the input to comparator 128 in place of the output from the op-amp 112, until the feedback network of op-amp 112, including capacitors 118, 122 and resistor 114 has had time to catch up with the change in load current. In one embodiment, this operation raises the current in the inductor on the next PWM pulse. The inductor may reside in the same SMPS in which circuit 100 resides. The inductor may be charged and then discharged to move current from the input of the SMPS to the output. In another embodiment, this operation may begin charging capacitors 118, 122 in the feedback network.

When HLT 106 times out, HLT 106 may be configured to generate an enable signal again. Op-amp 112, once reenabled, may be configured to once again take over the driving of comparator 128 and the feedback network. When op-amp 112 is enabled, it may be configured to drive comparator 128 even though DAC 104 may also be producing an analog signal to the same terminal of comparator 128 since the output of op-amp 112 may have a lower impedance than the output of the DAC 104, and thus takes presence over the output voltage to the comparator 128.

As discussed above, when a high-current event occurs, such as when a system (in which circuit 100 is located) boots up and elements and peripherals thereof require power, trigger 108 may be set. FVR 102 may provide a fixed reference, which may be scaled through DAC 110 as needed and provided to op-amp 112. Then, the output of op-amp 112 may be configured to be set to a tri-state op-amp output, thereby allowing the output from the DAC 104 to take over and provide the reference voltage to the comparator 128 when op-amp 112 is disabled. DAC 104 may drive the inductor current to the higher current level for an increased load, or to a lower current level for a decreased load. As discussed above, capacitors 114, 118 in the feedback network may thereby be charged during operation of the SMPS. In particular, capacitors 114, 118 may be charged to levels that would normally occur at the higher output current that is expected by elements needing power from circuit 100. After a short charging period, op-amp 112 output may be re-enabled and may continue its feedback control function at the higher output current.

HLT 106 may be set for a sufficient time to charge the filter capacitors, such as capacitors 118, 122. When HLT 106 times out, op-amp 112 output is re-enabled and the loop may continue operating in a normal fashion.

In one embodiment, trigger 108 may set the HLT 106 to disable the output of the op-amp 112, and allowing the output of the DAC 104 to replace the output from the op-amp 112 when the load current is discontinued (forcing a reduction in current provided to the SMPS inductor). This may cause circuit 100 to act as a load dump so as to provide a rapid reduction in output current. The output of op-amp 112 may be requesting too much current in the inductor at the instant of a quick reduction of load current. This may result in an overvoltage on the output until op-amp 112 catches up. Accordingly, in one embodiment, the disabled tristate output of op-amp 112 is replaced at a lower current drive provided by DAC 104 until the capacitors in the feedback network are discharged to the new operating level. Circuit 100 may thus disable op-amp 112 output and set comparator 128 for a lower inductor current value until the feedback capacitors may be discharge to the new level.

Although a single trigger 108 is illustrated, circuit 100 or a system including circuit 100 may include multiple instances of trigger 108, each predicated on different trigger conditions. For example, a low load or a high load may be OR'd together for trigger 108. In another example, a system may include two instances of circuit 100, each configured separately for example, a low load or a high load. In such an example, different FVR (programmed) values may be used.

Use of hardware-based trigger 108 may cause circuit 100 to work automatically without software input. Trigger 108 may be connected to further monitor logic (not shown) such as a comparator monitoring output current. When there is a rapid change, an event may be generated. The event triggers may also cause the system to be a synchronized system. A controller in the load may know what change will occur and trigger an appropriate event when needed.

Figure 2:
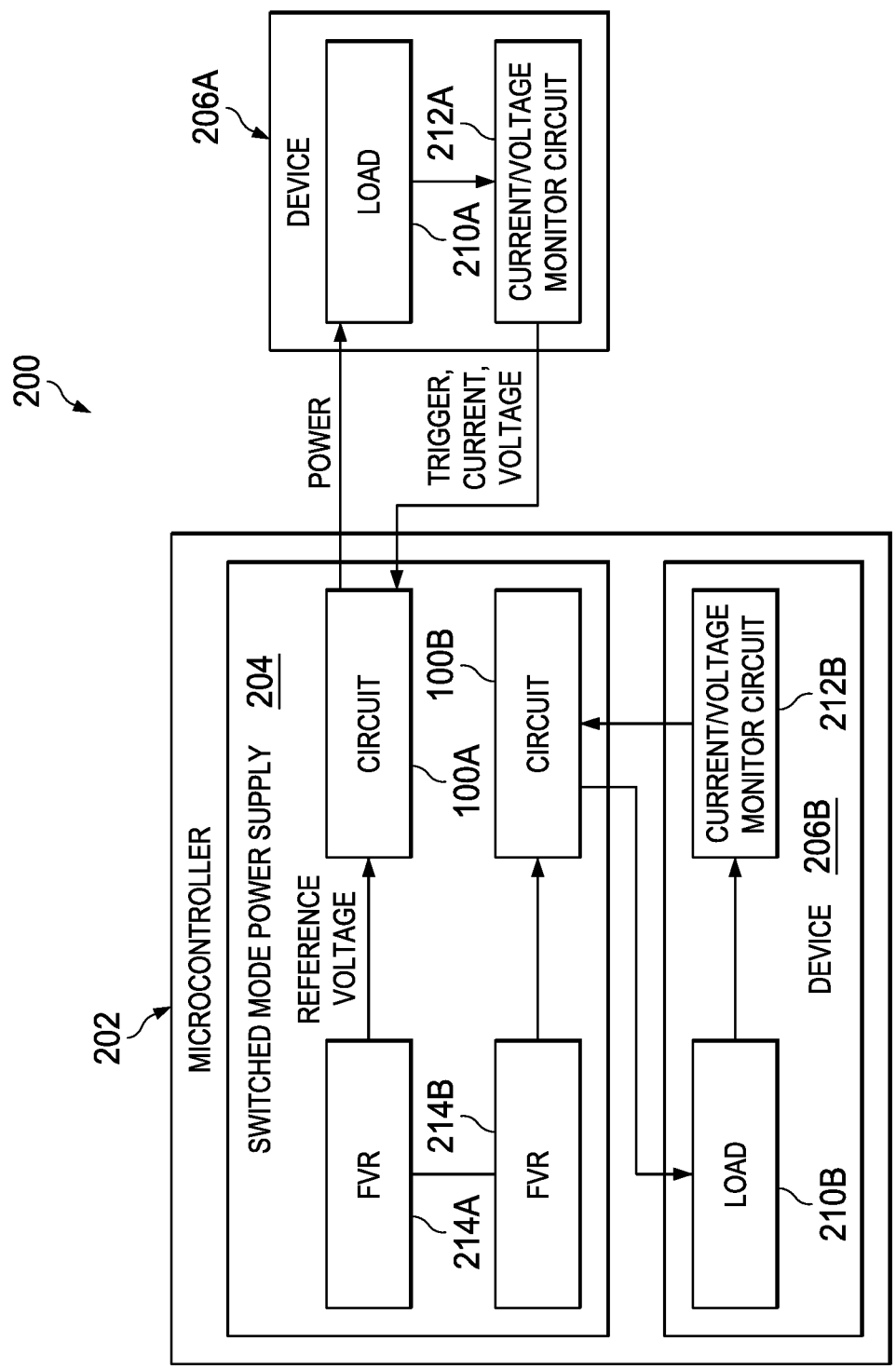
FIG. 2 illustrates an example system using a system using a circuit for fast transient response, according to embodiments of the present disclosure.

Circuit 100 may be used in any suitable context, such as in a microcontroller, power supply, power controller, or other suitable electronic device. FIG. 2 is an illustration of an example system 200 utilizing circuit 100 for fast transient response, according to embodiments of the present disclosure.

System 200 may include a microcontroller 202, or another suitable entity such as a power supply or power controller. Microcontroller 202, or another suitable such entity, may implement a SMPS. Microcontroller 202 may be configured to provide power to one or more other devices 206. Such devices 206 may be included within, or may be connected to, microcontroller 202. For example, device 206A may be connected to microcontroller 202 while device 206B may be within microcontroller 202. Devices 206 may include any electronic device that requires power and may each be implemented in different ways.

Device 206 may include a load 210. Power for load 210 may be provided by a SMPS 204. The operating conditions of load 210 may be monitored by circuitry included within monitor circuit 212. Monitor circuit 212 may compare voltage, current, or other values against reference values using comparators or other suitable circuitry. Monitor circuit 212 may report these values, or triggers based upon these values, to SMPS 204.

Within SMPS 204, a given instance of circuit 100 may serve one or more devices 206. For example, circuit 100A may serve device 206A, and circuit 100B may serve device 206B. In another example, circuit 100A may serve devices 206A and 206B. For a given device 206, an instance of circuit 100 may be given a reference voltage through FVR 214.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

The invention claimed is:

1. A switched-mode power supply (SMPS) control circuit, comprising:
    a loop control circuit comprising:
        an operational amplifier having:
            first and second inputs; and
            an output configured to be enabled and disabled; and
        a loop filter coupled between the first input and the output of the operational amplifier, wherein the first input of the operation amplifier and the loop filter are coupled to a voltage output of an SMPS;
    a first voltage reference coupled to the second input of the operational amplifier;
    a voltage comparator having first and second inputs and an output, wherein: the first input is coupled to a current-to-voltage circuit configured to measure output current of the SMPS, and the second input is coupled to the output of the operational amplifier, whereby voltage applied to an inductor of the SMPS is configured to be controlled by the output of the voltage comparator; and
    a second voltage reference having an output coupled to the operational amplifier and the second input of the comparator, wherein when the operational amplifier output is disabled the second voltage reference is configured to supply a voltage to the second input of the voltage comparator instead of the operational amplifier output supplying voltage to the second input of the voltage comparator, whereby the voltage comparator is configured to use the output of the second voltage reference rather than the output of the operational amplifier to control the voltage to the SMPS inductor; and
    a timer including:
        an input configured to be triggered by an event; and
        an output configured to enable and disable the output of the operational amplifier;
    wherein the event is an increase or a decrease in a load current of the SMPS;
    wherein:
        the time to be counted by the timer is programmable; and
        the time to be counted by the timer is determined by an anticipated SMPS output current increase or decrease.

2. The SMPS control circuit according to claim 1, wherein:
    the event is an increase in the SMPS load current; and
    the output of the second voltage reference supplies the voltage to the second input of the voltage comparator instead of the operational amplifier, whereby a voltage from the second voltage reference is greater than the voltage from the operational amplifier when the operational amplifier is enabled.

3. The SMPS control circuit according to claim 2, wherein a loop filter voltage charges up during the current increase event.

4. The SMPS control circuit according to claim 1, wherein:
    the event is a decrease in the SMPS load current; and
    the output of the second voltage reference supplies the voltage to the second input of the voltage comparator instead of the operational amplifier, whereby the voltage from the second voltage reference is less than a voltage from the operational amplifier when the operational amplifier is enabled.

5. The SMPS control circuit according to claim 4, wherein a loop filter voltage discharges down during the current decrease event.

6. The SMPS control circuit according to claim 1, wherein the first inputs of the operational amplifier and voltage comparator are negative inputs, and the second inputs of the operational amplifier and voltage comparator are positive inputs.

7. The SMPS control circuit according to claim 1, wherein the loop filter comprises at least one resistor and at least one capacitor.

8. The SMPS control circuit according to claim 1, wherein the first voltage reference comprises a fixed voltage reference and a first digital-to-analog converter (DAC) having an output coupled to the second input of the operational amplifier.

9. The SMPS control circuit according to claim 8, wherein the first DAC is programmable for adjusting a voltage to the second input of the operational amplifier.

10. The SMPS control circuit according to claim 1, wherein the second voltage reference comprises a second DAC and is programmable.

11. The SMPS control circuit according to claim 1, wherein the second voltage reference is programmed to supply a voltage that corresponds to an estimated increased load current.

12. The SMPS control circuit according to claim 1, wherein the second voltage reference is programmed to supply a voltage that corresponds to an estimated decreased load current.

13. The SMPS control circuit according to claim 1, wherein the loop filter is charged or discharged by an increase or decrease, respectively, of the voltage from the second voltage reference during the event.

14. The SMPS control circuit according to claim 1, wherein the operational amplifier comprises a tri-state output, wherein when the tri-state output is disabled it is at a high impedance and does not affect the voltage from the second voltage reference.

15. A method for controlling a switched-mode power supply (SMPS), said method comprising the steps of:
   providing a control loop including a comparator and an operational amplifier, wherein:
      the operational amplifier includes an output that can be enabled and disabled; and
      the control loop compares a SMPS output voltage to a first voltage reference and provides a control voltage from the output of the operational amplifier to the comparator that controls voltage to an inductor of the SMPS based upon the control voltage and an output current of the SMPS;
   providing a timer having an input coupled to a trigger signal and an output coupled to the operational amplifier, wherein:
      when the timer is not timing, the output of the operational amplifier is enabled; and
      when the timer is timing, the output of the operational amplifier is disabled; and
   providing a second voltage reference that is coupled to the comparator when the output of the operational amplifier is disabled;
   wherein:
      the trigger signal is based on an event that is an increase or a decrease in the SMPS load current;
      the time to be counted by the timer is programmable; and
      the time to be counted by the timer is determined by an anticipated SMPS output current increase or decrease.

16. The method according to claim 15, wherein the trigger signal is in response to a current load change event of the SMPS.

17. The method according to claim 16, wherein a voltage from the second voltage reference is greater than the control voltage from the operational amplifier during a current load increase event.

18. The method according to claim 16, wherein a voltage from the second voltage reference is less than the control voltage from the operational amplifier during a current load decrease event.

* * * * *